(12) United States Patent
Nakamura

(10) Patent No.: US 8,374,497 B2
(45) Date of Patent: Feb. 12, 2013

(54) AUTOFOCUSING ZOOM LENS

(75) Inventor: Tomoyuki Nakamura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/535,960

(22) Filed: Jun. 28, 2012

(65) Prior Publication Data

US 2012/0269500 A1  Oct. 25, 2012

Related U.S. Application Data

(62) Division of application No. 13/075,669, filed on Mar. 30, 2011.

(30) Foreign Application Priority Data

Mar. 31, 2010 (JP) .................................. 2010-081437

(51) Int. Cl.
*G03B 17/00* (2006.01)
(52) U.S. Cl. ............................................ 396/79; 396/80
(58) Field of Classification Search ............... 396/79–82, 396/87, 97, 102, 104, 125; 348/347, 349
See application file for complete search history.

(56) References Cited

U.S. PATENT DOCUMENTS 7,945,150 B2 * 5/2011 Ishii .............................. 396/104

* cited by examiner

*Primary Examiner* — Clayton E LaBalle
*Assistant Examiner* — Minh Phan
(74) *Attorney, Agent, or Firm* — Canon U.S.A., Inc. IP Division

(57) ABSTRACT

In an autofocusing zoom lens, a depth of focus $\epsilon$ is obtained based on an aperture value Fno of a variable diaphragm and a diameter of a permissible circle of confusion $\delta$. A focal position variation amount $\Delta sk$ for a predetermined positional displacement amount $\Delta Fp0$ of a focusing lens unit is obtained according to a position Fp of the focusing lens unit and a variable magnification state Zp. If a predetermined variation amount $\Delta Fp$ of the focusing lens unit satisfies a first condition, the focusing lens unit is not driven. If the first condition is not satisfied and a second condition is satisfied, the focusing lens unit is driven based on a second autofocusing unit, and if the second condition is not satisfied, the focusing lens unit is driven based on a first autofocusing unit.

7 Claims, 10 Drawing Sheets

F: FOCAL LENGTH OF ZOOM LENS
x: DISTANCE FROM FOCUS TO OBJECT
x': DISTANCE FROM FOCUS TO IMAGE PLANE

FIG.5

| | POSITION FP OF FOCUSING LENS UNIT → | | |
|---|---|---|---|
| | 0 | ... | p |
| 0 | Δsk(0,0) | | Δsk(p,0) |
| ⋮ | | | |
| q | Δsk(0,q) | | Δsk(p,q) |

VARIABLE MAGNIFICATION STATUS ZP ↓

AUTOFOCUSING ZOOM LENS

CROSS REFERENCE TO RELATED APPLICATIONS

This application is a Divisional application pursuant to 37 CFR §1.53(b) of prior U.S. application Ser. No. 13/075,669 filed Mar. 30, 2011 which claims foreign priority benefit from Japanese Patent Application No. 2010-081437 filed Mar. 31, 2010, the disclosures of which are hereby incorporated by reference herein in their entirety.

BACKGROUND OF THE INVENTION

1. Field of the Invention

The present invention relates to an autofocusing zoom lens which includes a distance measurement unit provided separately from a photographic optical system and configured to execute focusing.

2. Description of the Related Art

In recent years, a broadcast high-definition (HD) recording system has been widely used and a large-size home monitor has been used. Under these circumstances, sufficient focusing accuracy cannot be achieved by merely executing manual focusing as in a conventional method. Accordingly, a problem of a defocused image often occurs. To solve the above-described problem, it is desired that a lens for an HD system have a highly accurate autofocusing function.

As an autofocusing method, a contrast autofocusing method, which uses a video signal from an imaging unit, such as a charge-coupled device (CCD) sensor, is widely known. In addition, an external light autofocusing method, which uses a distance measurement unit that executes a trigonometric distance measurement operation, is also widely known.

For example, Japanese Patent No. 3738795 discusses a method that uses the contrast autofocusing method and the external autofocusing method described above in combination. More specifically, the conventional method switches the autofocusing methods according to various conditions, such as the temperature inside or outside the apparatus, an aperture value, or a focal length.

The zoom lens discussed in Japanese Patent No. 3738795 is a rear-focus type zoom lens capable of executing focusing with a high accuracy by the contrast autofocusing method after roughly executing focusing by the external autofocusing method. With this configuration, the zoom lens discussed in Japanese Patent No. 3738795 can achieve quick and highly accurate focusing.

However, in the broadcasting industry, in which a user is particular about shooting a normal image, the user is interested in the normality of the image rather than the speed of focusing.

In the contrast autofocusing method, an operation for focusing is necessary in calculating a maximum value of contrast. Therefore, an abnormality of a video, such as overshooting or vibrated reproduction of a defocused image, may occur. Accordingly, it is desired that the contrast autofocusing method be used under restricted conditions of use.

SUMMARY OF THE INVENTION

The present invention is directed to an autofocusing zoom lens capable of executing a focusing operation at a high speed, with a high accuracy, and with no abnormality occurring on an image obtained by executing appropriate control of focus driving according to states of zooming, focusing, and an aperture.

According to an aspect of the present invention, an autofocusing zoom lens, which is capable of being detachably mounted on an image pickup apparatus and includes, in order from an object side to an image side, a focusing lens unit configured to move during focusing, a variable-magnification lens unit configured to move during variation of magnification, and a variable diaphragm capable of varying an aperture diameter, includes a position detection unit configured to detect a position of the focusing lens unit, a magnification-varying state detection unit configured to detect a position of the variable-magnification lens unit, and an aperture value detection unit configured to detect an aperture value of the variable diaphragm, a distance measurement unit configured to measure a distance to an object, a communication unit configured to communicate with the image pickup apparatus, a video signal receiving unit configured to receive a video signal from the image pickup apparatus, a first autofocusing unit configured to drive the focusing lens unit based on a result of detection by the distance measurement unit, and a second autofocusing unit configured to drive the focusing lens unit based on the video signal from the image pickup apparatus. In the autofocusing zoom lens, a depth of focus $\epsilon$ is obtained based on an aperture value Fno of the variable diaphragm and a diameter of a permissible circle of confusion $\delta$. A focal position variation amount $\Delta sk$ for a predetermined positional displacement amount $\Delta Fp0$ of the focusing lens unit is obtained according to a position Fp of the focusing lens unit and a variable magnification state Zp. If a predetermined variation amount $\Delta Fp$ of the focusing lens unit satisfies the following first condition:

$$|\Delta Fp \cdot \Delta sk| - \epsilon \leq 0,$$

the focusing lens unit is not driven. If the first condition is not satisfied and the following second condition is satisfied:

$$|\Delta sk| - \epsilon > 0 \text{ and}$$

$$\Delta Fp0 - |\Delta Fp| > 0,$$

the focusing lens unit is driven based on the second autofocusing unit, and if the second condition is not satisfied, the focusing lens unit is driven based on the first autofocusing unit.

According to another aspect of the present invention, an autofocusing zoom lens, which is capable of being detachably mounted on an image pickup apparatus and includes, in order from an object side to an image side, a focusing lens unit configured to move during focusing, a variable-magnification lens unit configured to move during variation of magnification, and a variable diaphragm capable of varying an aperture diameter, includes a position detection unit configured to detect a position of the focusing lens unit, a magnification-varying state detection unit configured to detect a position of the variable-magnification lens unit, and an aperture value detection unit configured to detect an aperture value of the variable diaphragm, a distance measurement unit configured to measure a distance to an object, a communication unit configured to communicate with the image pickup apparatus, a video signal receiving unit configured to receive a video signal from the image pickup apparatus, a first autofocusing unit configured to drive the focusing lens unit based on a result of detection by the distance measurement unit, and a second autofocusing unit configured to drive the focusing lens unit based on the video signal from the image pickup apparatus. In the autofocusing zoom lens, a near point distance Sn and a far point distance Sf are obtained based on a focal length F and a diameter of a permissible circle of confusion δ. If a current focus position Obj and a resolution Det of the distance measurement unit satisfy the following first condition:

$Sf$-Obj>0 or

Obj-$Sn$>0, the focusing lens unit is not driven. If the first condition is not satisfied and the following second condition is satisfied:

($Sf$-$Sn$)-Det<0 and $Sf$-Obj <0 or

Obj-$Sn$<0, the focusing lens unit is driven based on the second autofocusing unit, and if the second condition is not satisfied, the focusing lens unit is driven based on the first autofocusing unit.

According to yet another aspect of the present invention, a camera apparatus includes the autofocusing zoom lens, and an image pickup apparatus (image sensor) located on the image side of the autofocusing zoom lens.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 5 is a table storing data of an amount of variation of focal position in relation to an amount of variation of the focusing lens unit.

DESCRIPTION OF THE EMBODIMENTS

Various exemplary embodiments, features, and aspects of the invention will be described in detail below with reference to the drawings.

Figure 1:
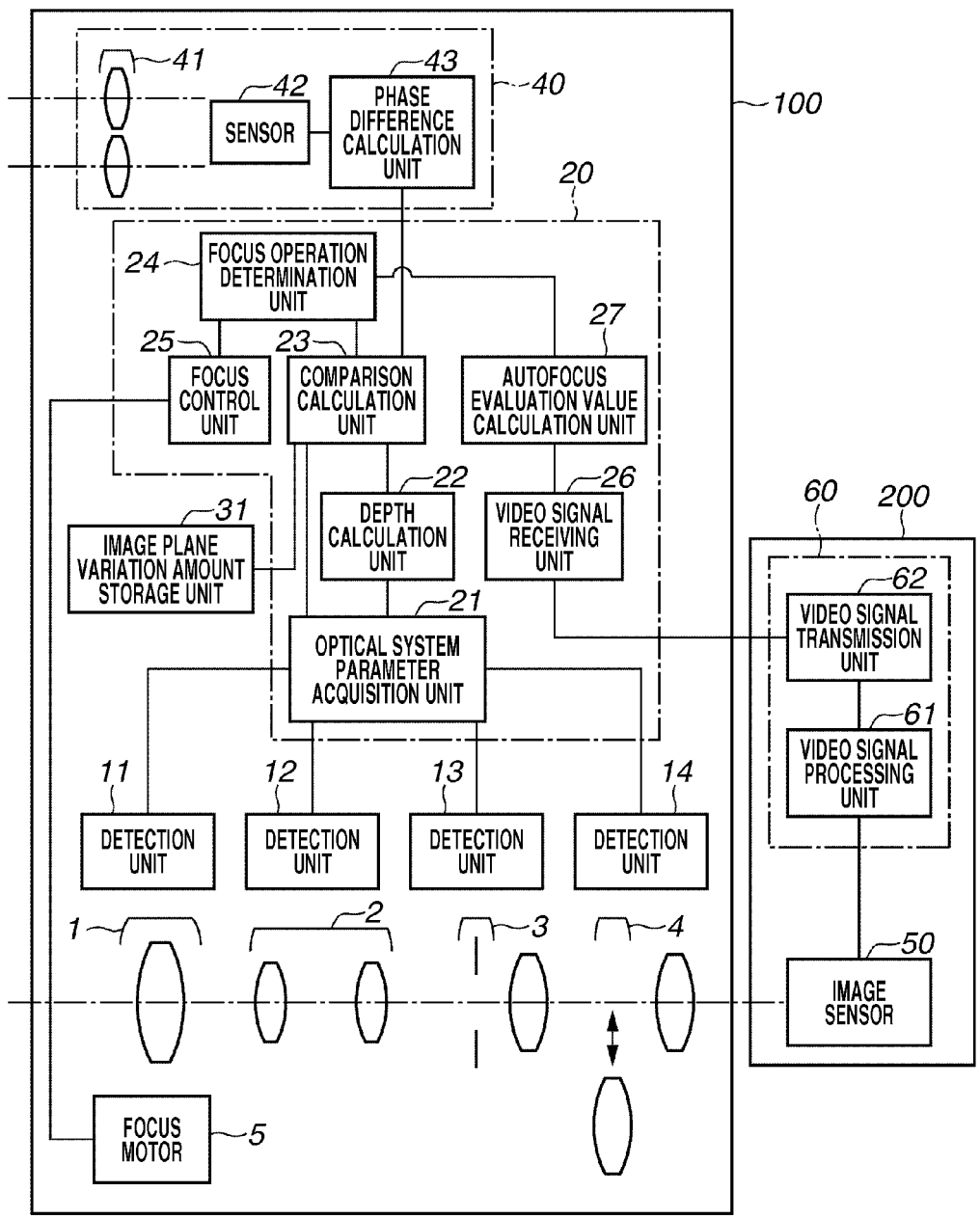
FIG. 1 illustrates an exemplary configuration of an image pickup apparatus having a zoom lens according to a first exemplary embodiment of the present invention.

FIG. 1 illustrates an exemplary configuration of an autofocusing zoom lens and an image pickup apparatus according to a first exemplary embodiment of the present invention. Referring to FIG. 1, a camera apparatus is constituted by an image pickup apparatus 200 and an autofocusing zoom lens 100. The zoom lens 100 is detachably mounted on the image pickup apparatus 200, so that it can be interchanged with other zoom lens.

The zoom lens 100 includes a focusing lens unit 1, a variable-magnification lens unit 2, a variable diaphragm 3, and an extender lens unit 4. The focusing lens unit 1 is stationary during variation of magnification along an optical axis. The variable-magnification lens unit 2 includes a plurality of lenses and has a variable magnification (magnification-varying) function. The focusing lens unit 1, the variable-magnification lens unit 2 and the variable diaphragm 3 are disposed along the optical axis of the zoom lens 100, while the extender lens unit 4 enters into and exits from the optical axis to change the focal length of the zoom lens 100. The focusing lens unit 1 is driven by a focus motor 5 under control of the focus control unit 25.

A detection unit 11 detects a position of the focusing lens unit 1. A detection unit 12 detects a state of variable magnification by the variable-magnification lens unit 2. A detection unit 13 detects an aperture value of the variable diaphragm 3. A detection unit 14 detects the state of entry or exit of the extender lens unit 4.

A calculation circuit 20 of the zoom lens 100 includes an optical system parameter acquisition unit 21, a depth calculation unit 22, a comparison calculation unit 23, a focus operation determination unit 24, a focus control unit 25, a video signal receiving unit 26, and an autofocus evaluation value calculation unit 27.

An image plane variation amount storage unit 31 is connected to the comparison calculation unit 23 of the calculation circuit 20. The image plane variation amount storage unit 31 stores data (table data) corresponding to the focal position variation amount Δsk, which is determined in relation to the predetermined positional displacement amount ΔFp0 of the focusing lens unit 1.

A distance measurement unit 40 primarily includes a distance measurement optical system 41, a distance measurement sensor 42, and a phase difference calculation unit 43. The distance measurement unit 40 is provided within the zoom lens 100. However, the distance measurement unit 40 can also be provided to the image pickup apparatus 200 instead.

The image pickup apparatus 200, which is provided to the image side of the zoom lens 100, includes an image sensor 50. More specifically, the image sensor 50 is provided at a location within the image pickup apparatus 200 on the optical path of the focusing lens unit 1 of the zoom lens 100.

An output of the image sensor 50 is transmitted to a calculation circuit 60, which is connected to the image sensor 50. The calculation circuit 60 includes a video signal processing unit 61 and a video signal transmission unit 62.

Figure 2:
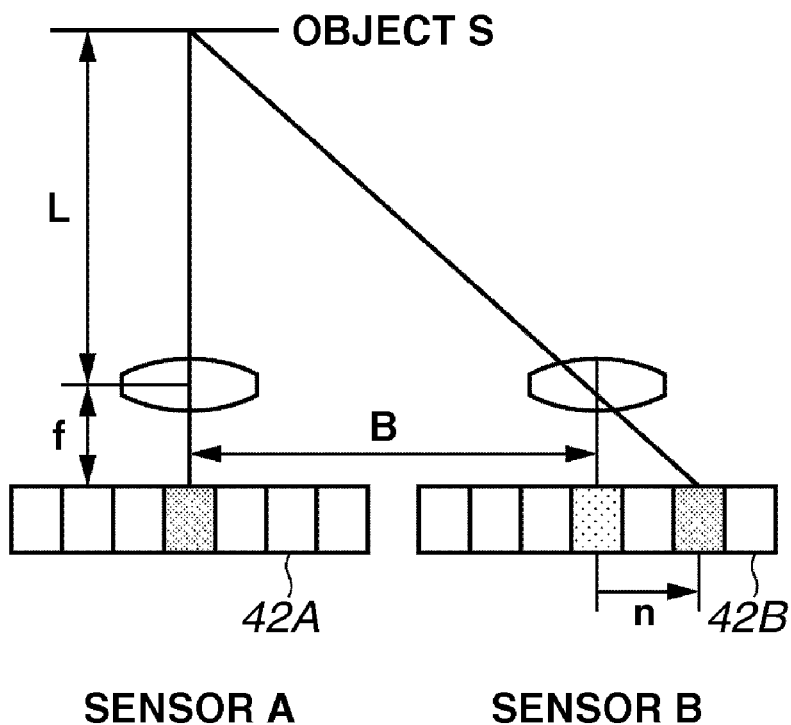
FIG. 2 illustrates the principle of a distance measurement unit.

FIG. 2 illustrates the principle of distance measurement by the distance measurement unit 40. In the example illustrated in FIG. 2, an object S exists in front of the distance measurement optical system 41.

When the distance to the object S is finite, a phase difference n may arise between signals incident to a sensor A 42A and a sensor B 42B of the distance measurement sensor 42. An object distance L can be calculated (obtained) based on the phase difference n. If the object distance L is infinite, the phase difference n is zero.

Let "f" be the focal length of the distance measurement unit 40 and "B" be a baseline length between the sensor A 42A and the sensor B 42B. Then, the object distance L can be expressed by the following expression (1):

$$L = f \cdot B/n \quad (1).$$

Therefore, the phase difference n and the object distance L have a relationship expressed by the following expression (2):

$$n = 1/L \quad (2).$$

Figure 3:
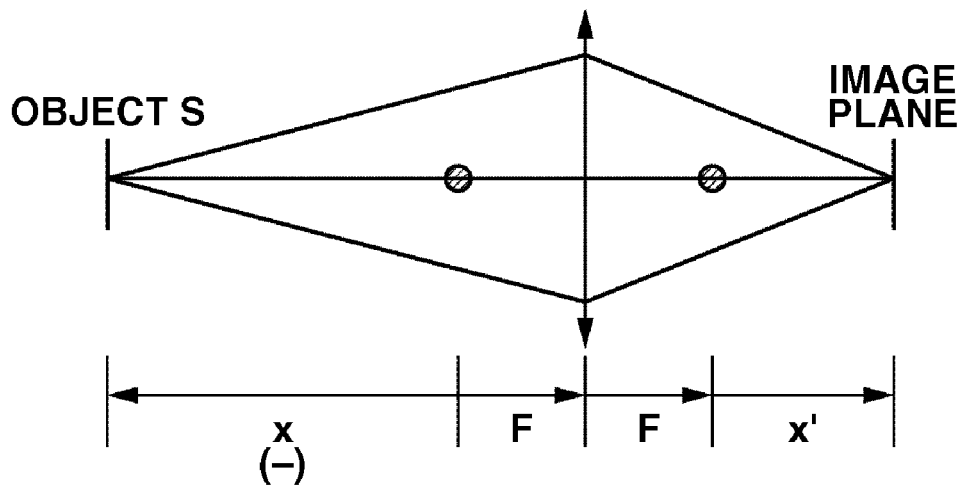
FIG. 3 illustrates an exemplary method of forming an image by a focusing lens unit, which is provided to a zoom lens at a location closest to the object side.

FIG. 3 illustrates an exemplary method of forming an image by the focusing lens unit 1, which is provided in the zoom lens 100 at a location closest to the object side. As a relational expression for a paraxial image forming method, the following expression (3), which is the Newton's method, can be used:

$$x \cdot x' = -F^2 \quad (3)$$

where "F" denotes the focal length, "x" denotes the distance from the focus to the object S, and "x'" denotes the distance from the focus to the image plane. As a result, the relationship between the distance x and the object distance L, if $|x| \gg F$, can be expressed by the following expression (4):

$$L \approx -x \quad (4).$$

In this case, the position Fp of the focusing lens unit 1, at which the focusing lens unit 1 is required to be positioned to correct the distance x', which is the amount of deviation from the focus, can be calculated by the following expression (5):

$$Fp \approx x' \quad (5).$$

According to the expressions (3) through (5), the following expression (6) can be derived:

$$L = F^2/Fp \quad (6).$$

The position Fp of the focusing lens unit 1 and the object distance L have a relationship expressed by the following expression (7):

$$Fp \propto 1/L \quad (7).$$

Figure 4:
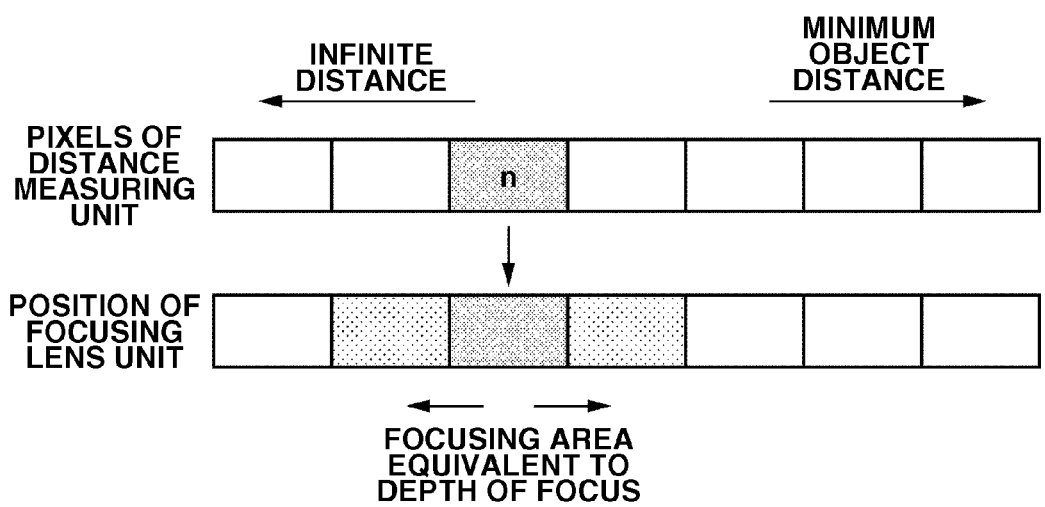
FIG. 4 illustrates an exemplary correlation between a position of a distance measurement sensor of a distance measurement unit and a position of the focusing lens unit.

FIG. 4 illustrates an exemplary correlation between the phase difference n and the position Fp of the focusing lens unit 1. In the present exemplary embodiment, the focusing lens unit 1 is provided on the object side of the variable-magnification lens unit 2. Therefore, the focal length F (FIG. 3) does not vary. Accordingly, the object distance L and the position FP of the focusing lens unit 1 can be defined on the one-to-one basis independently from variable magnification.

Based on the calculations by the expressions (2) and (7), the phase difference n and the position Fp of the focusing lens unit 1 are inversely proportional to the object distance L and can be expressed by the following expression (8):

$$Fp \propto n \quad (8).$$

Referring to FIG. 4, the phase difference n, which is output by the distance measurement unit 40, and the position Fp of the focusing lens unit 1 are proportional to each other. Accordingly, the phase difference n and the position Fp of the focusing lens unit 1 can be determined on the one-to-one basis.

After the zoom lens 100 is powered on, the parameters of the optical system for focusing, zooming, the aperture, and the extender, which have been detected by the detection units 11 through 14, are transmitted to the depth calculation unit 22 and the comparison calculation unit 23 via the optical system parameter acquisition unit 21.

The depth calculation unit 22 calculates a depth of focus $\epsilon$ based on current parameters of the optical system. The depth calculation unit 22 transmits the calculated depth of focus $\epsilon$ to the comparison calculation unit 23. As expressed by the following expression (9), the depth of focus $\epsilon$ can be calculated based on the aperture value Fno of the variable diaphragm 3 and a diameter of a permissible circle of confusion $\delta$. More specifically, the diameter of a permissible circle of confusion can be appropriately defined as a dimension twice as large as the pitch of a pixel of the image sensor or as a dimension having a range from the dimension equivalent to the pixel pitch to a dimension three times as large as the pixel pitch.

$$\epsilon = Fno \cdot \delta \quad (9).$$

The image plane variation amount storage unit 31 stores data corresponding to the focal position variation amount $\Delta sk$ for the predetermined displacement amount $\Delta Fp0$ of the focusing lens unit 1 illustrated in FIG. 5 as table data. The table data stored by the image plane variation amount storage unit 31 includes data on two axes, i.e., the position Fp of the focusing lens unit 1 and the variable magnification state Zp. The variable magnification state Zp can include the position of the variable-magnification lens unit 2 only. Alternatively, the variable magnification state Zp can include the position of the variable-magnification lens unit 2 and the position of the extender lens unit 4.

The comparison calculation unit 23 reads the focal position variation amount $\times sk$ according to the position Fp of the focusing lens unit 1 and the variable magnification state Zp from the image plane variation amount storage unit 31.

If the table data stored by the image plane variation amount storage unit 31 does not include any value equivalent to the position Fp of the focusing lens unit 1 or the variable magnification state Zp, the comparison calculation unit 23 can read the focal position variation amount $\Delta sk$ of a closest focal position. However, the present exemplary embodiment is not limited to this. More specifically, alternatively, the values in the table stored by the image plane variation amount storage unit 31 can be interpolated by linear approximation to increase the accuracy of the values.

If it is detected that the extender lens unit 4 has been inserted, a value acquired by multiplying the focal position variation amount $\Delta sk$, which is stored by the image plane variation amount storage unit 31, by a square of the magnification of the extender lens unit 4 is used. However, the present exemplary embodiment is not limited to this. More specifically, the same effect can be achieved by the following configuration. More specifically, alternatively, the image plane variation amount storage unit 31 can separately store table data for the extender lens unit 4. In this case, the extender lens unit 4 switches the types of the table data according to whether the extender lens unit 4 has been inserted.

The phase difference calculation unit 43 of the distance measurement unit 40 calculates the phase difference based on the information transmitted from the distance measurement sensor 42. The calculated phase difference is transmitted to the comparison calculation unit 23. The comparison calculation unit 23 calculates a predetermined variation amount $\Delta Fp$ of the focusing lens unit 1 corresponding to the received phase difference.

The predetermined variation amount $\Delta Fp$ of the focusing lens unit 1, the predetermined positional displacement amount $\Delta Fp0$, the focal position variation amount $\Delta sk$, and the depth of focus $\epsilon$, which are calculated in the above-described manner, are transmitted to the focus operation determination unit 24. The focus operation determination unit 24 executes an operation by the following expressions (10) through (12) based on the received values:

$$|\Delta Fp \cdot \Delta sk| - \epsilon \leq 0 \tag{10}$$

$$|\Delta sk| - \square > 0 \tag{11}$$

$$\Delta Fp0 - |\Delta Fp| > 0 \tag{12}.$$

If the condition expressed by the expression (10) is satisfied, it is not necessary to execute a focusing operation. Accordingly, in this case, no signal is transmitted to components subsequent to the focus operation determination unit 24.

If the condition expressed by the expression (11) or (and) the condition expressed by the expression (12) is (are) not satisfied, the external light autofocusing is executed by using a first autofocusing unit. In this case, the focus operation determination unit 24 transmits a signal to the focus control unit 25 to drive the focusing lens unit 1 by an amount equivalent to the predetermined variation amount $\Delta Fp$ of the focusing lens unit 1.

The focus control unit 25 converts the drive amount into a rotational angle and transmits the rotational angle that is equivalent to a necessary displacement amount to the focus motor 5. The focus motor 5 rotationally drives the focusing lens unit 1.

If the conditions expressed by the expressions (11) and (12) are simultaneously satisfied, the contrast autofocusing is executed by using a second autofocusing unit. In this case, a video signal input to the image sensor 50 of the image pickup apparatus 200 is transmitted to the video signal processing unit 61. The video signal receiving unit 26 of the zoom lens 100 receives the video signal via the video signal transmission unit 62. In addition, the autofocus evaluation value calculation unit 27 extracts the contrast value only. To maximize the contrast value, the focus operation determination unit 24 instructs the focus motor 5 to drive the focusing lens unit 1 via the focus control unit 25.

In the present exemplary embodiment, the autofocus evaluation value calculation unit 27 is provided inside the zoom lens 100. However, the present exemplary embodiment is not limited to this. More specifically, the same effect can also be achieved if the autofocus evaluation value calculation unit 27 is provided to the image pickup apparatus 200.

Figure 6:
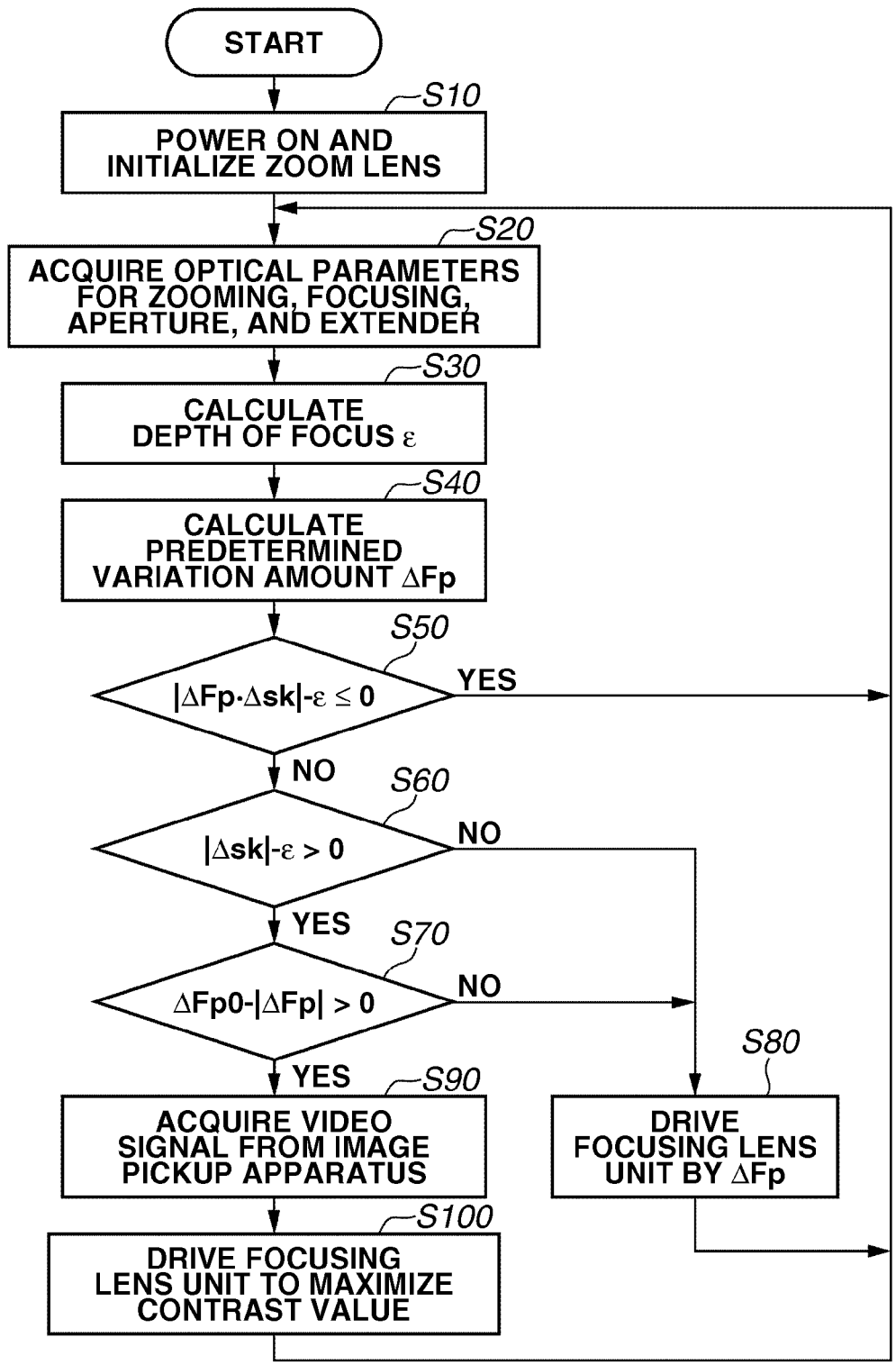
FIG. 6 is a flow chart illustrating an exemplary flow of an autofocusing operation according to the first exemplary embodiment.

FIG. 6 is a flow chart illustrating an exemplary flow of an autofocusing operation executed by the image pickup apparatus according to the present exemplary embodiment having the zoom lens 100 illustrated in FIG. 1.

Referring to FIG. 6, instep S10, the zoom lens 100 is powered on and initialized. In step S20, simultaneously with the end of the initialization, the optical system parameter acquisition unit 21 acquires optical parameters, such as focusing parameters, zooming parameters, aperture parameters, and extender parameters, from the detection units 11 through 14.

In step S30, the optical system parameter acquisition unit 21 transmits the acquired optical system parameters to the depth calculation unit 22. The depth calculation unit 22 calculates the depth of focus $\epsilon$ based on the received optical system parameters. The depth calculation unit 22 transmits the calculated depth of focus $\epsilon$ to the comparison calculation unit 23.

On the other hand, in step S40, the phase difference n, which has been acquired by the distance measurement unit 40, is transmitted to the comparison calculation unit 23. The comparison calculation unit 23 calculates the predetermined variation amount $\Delta Fp$ of the focusing lens unit 1. Then, the comparison calculation unit 23 reads the focal position variation amount $\Delta sk$ corresponding to the position Fp of the focusing lens unit 1 and the variable magnification state Zp from the table data stored by the image plane variation amount storage unit 31 (FIG. 5). The comparison calculation unit 23 then transmits the read focal position variation amount $\Delta sk$ to the focus operation determination unit 24.

In step S50, the focus operation determination unit 24 executes an operation by using the expression (10) based on the predetermined variation amount $\Delta Fp$, the focal position variation amount $\Delta sk$, and the depth of focus $\epsilon$. If the condition expressed by the expression (10) is satisfied (YES in step S50), then the focus operation determination unit 24 determines that the focusing operation is not to be executed. In this case, the processing returns to step S20.

On the other hand, if the condition in the expression (10) is not satisfied (NO in step S50), then the processing advances to step S60. In step S60, the focus operation determination unit 24 executes the operation based on the expression (11) by using the focal position variation amount $\Delta sk$ and the depth of focus $\epsilon$.

If the condition in the expression (11) is not satisfied (NO in step S60), then the processing advances to step S80. In step S80, the focus operation determination unit 24 instructs the focus motor 5 to drive the focusing lens unit 1, via the focus control unit 25, by the amount equivalent to the predetermined variation amount $\Delta Fp$. In addition, the external light autofocusing is executed by using the first autofocusing unit.

On the other hand, if the condition expressed by the expression (11) is satisfied (YES in step S60), then the processing advances to step S70. In step S70, the focus operation determination unit 24 executes the operation based on the expression (12) by using the positional displacement amount $\Delta Fp0$ and the predetermined variation amount $\Delta Fp$.

If the condition expressed by the expression (12) is not satisfied (NO in step S70), then the processing advances to step S80. On the other hand, if the condition expressed by the expression (12) is satisfied (YES in step S70), then the processing advances to step S90. In step S90, the contrast autofocusing is executed by using the second autofocusing unit.

More specifically, in step S90, the video signal receiving unit 26 of the zoom lens 100 receives a video signal input to the image sensor 50 of the image pickup apparatus 200 via the video signal processing unit 61.

In step S100, the autofocus evaluation value calculation unit 27 extracts the contrast value only. To maximize the contrast value, the focus operation determination unit 24 instructs the focus motor 5 to drive the focusing lens unit 1 via the focus control unit 25.

In the present exemplary embodiment, the position Fp of the focusing lens unit 1 corresponding to the depth of focus $\epsilon$ is calculated based on the table data. However, the present exemplary embodiment is not limited to this. More specifically, the same effect can be achieved by directly calculating (obtaining) the depth of focus.

Figure 7:
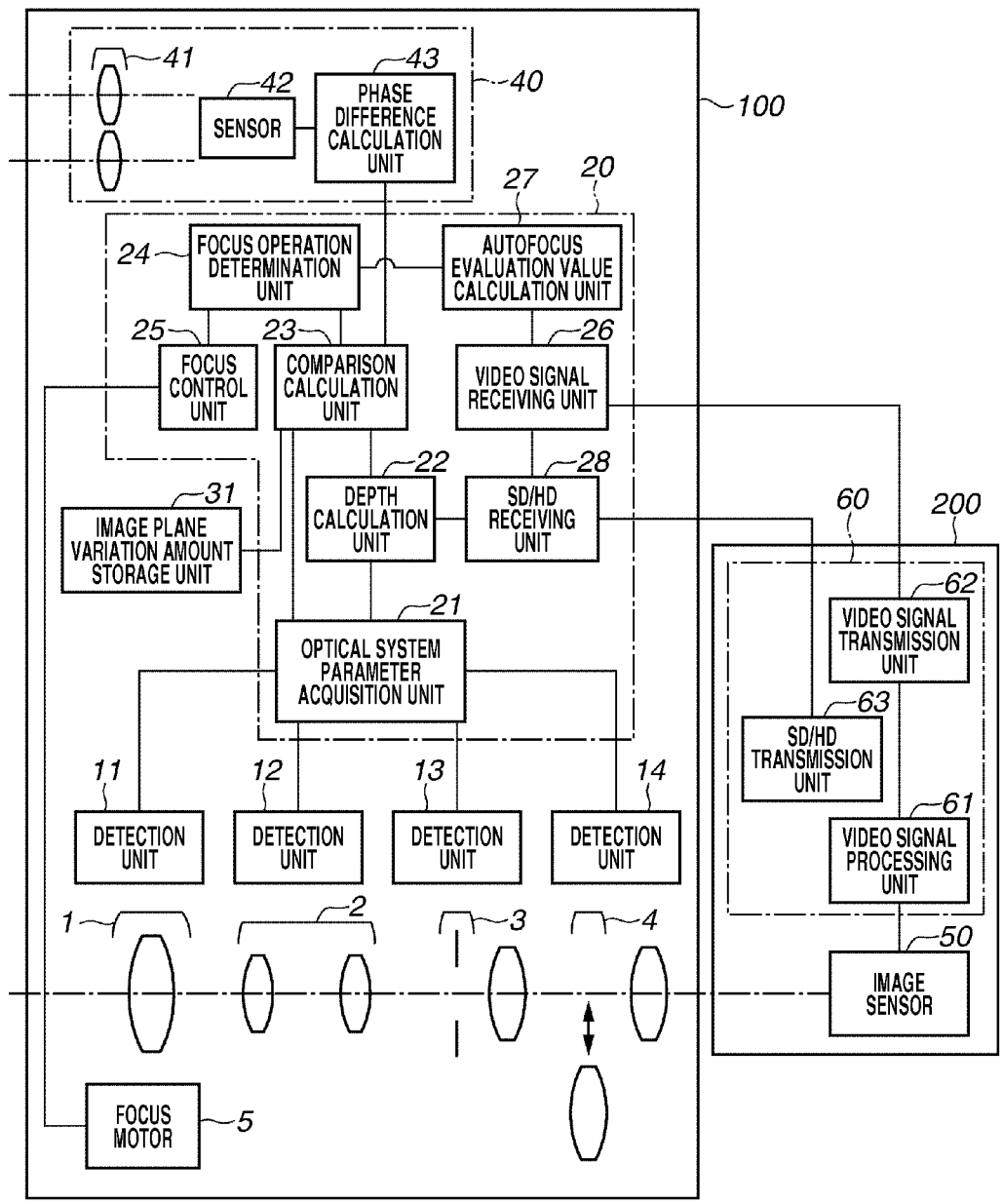
FIG. 7 illustrates an exemplary configuration of an image pickup apparatus having a zoom lens according to a second exemplary embodiment of the present invention.

FIG. 7 illustrates an exemplary configuration of a second exemplary embodiment of the present invention. The exemplary embodiment illustrated in FIG. 7 is different from the first exemplary embodiment illustrated in FIG. 1 in the following points. Features corresponding to numerals already described in reference to FIG. 1 will not be described to avoid unnecessary duplication.

More specifically, a standard definition (SD)/high definition (HD) receiving unit 28 is provided to the calculation circuit 20 of the zoom lens 100 in the present exemplary embodiment. In addition, an SD/HD transmission unit 63, which transmits information about which of SD and HD the image pickup apparatus 200 is compliant with, is provided to the image pickup apparatus 200.

After the zoom lens 100 is powered on, the parameters of the optical system for focusing, zooming, the aperture, and the extender, which have been detected by the detection units 11 through 14, are transmitted to the optical system parameter acquisition unit 21. The optical system parameter acquisition unit 21 further transmits the received information (the optical system parameters) to the depth calculation unit 22 and the comparison calculation unit 23.

On the other hand, after a communication with the image pickup apparatus 200 is established, information about the image quality (SD or HD) of the image pickup apparatus 200 is transmitted from the SD/HD transmission unit 63 to the depth calculation unit 22 via the SD/HD receiving unit 28 of the zoom lens 100.

The depth calculation unit 22 calculates the depth of focus $\epsilon$ based on the current optical system parameters and the type of the image pickup apparatus 200. Then, the depth calculation unit 22 transmits the calculated depth of focus $\epsilon$ to the comparison calculation unit 23. The depth of focus $\epsilon$ is dependent on the permissible circle of confusion $\delta$. The permissible circle of confusion $\delta$ differs according to the type of the image pickup apparatus 200. Thereafter, the present exemplary embodiment executes the same processing as that of the first exemplary embodiment.

Figure 8:
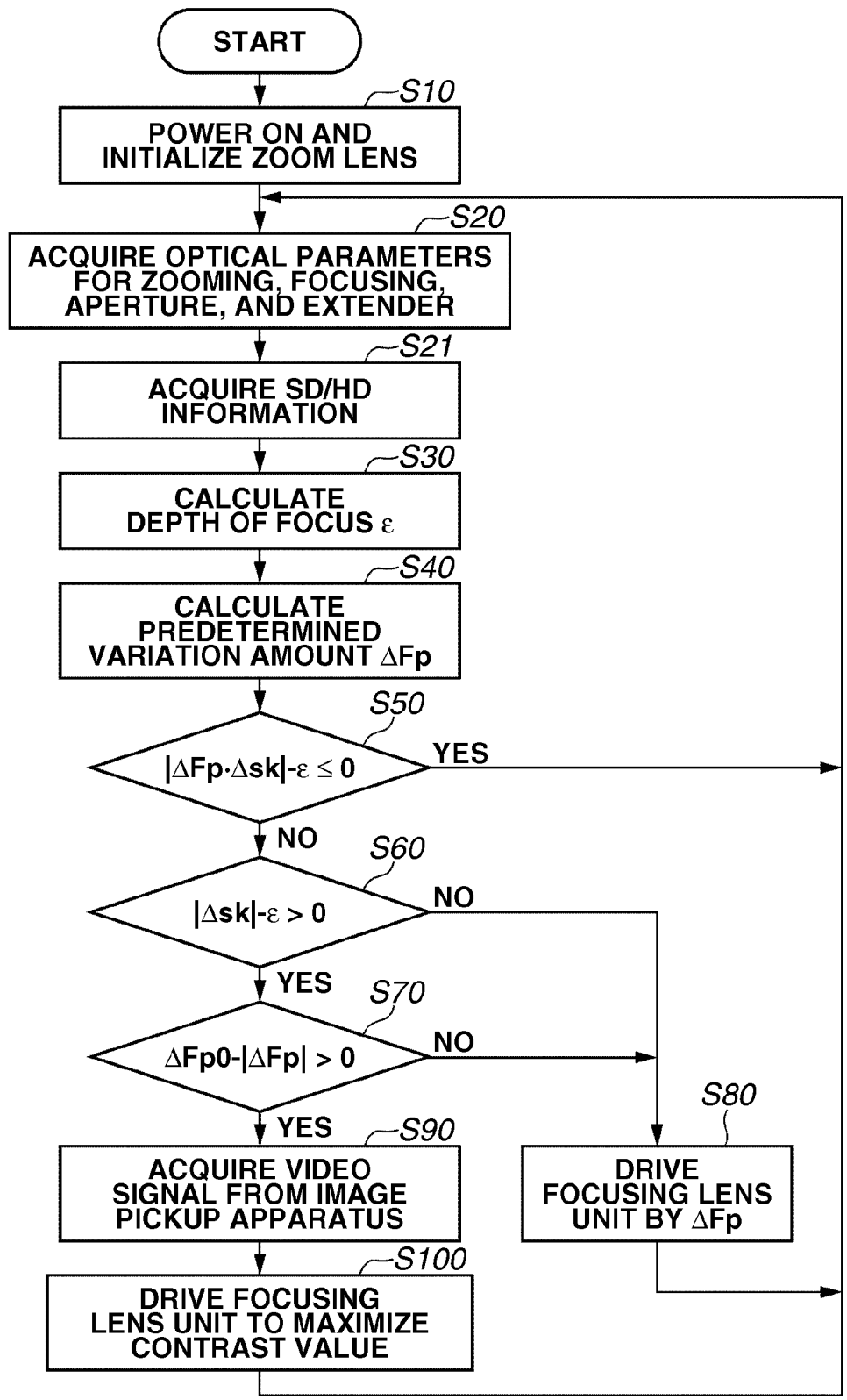
FIG. 8 is a flow chart illustrating an exemplary flow of processing according to the second exemplary embodiment.

FIG. 8 is a flow chart illustrating an exemplary flow of an autofocusing operation executed by the image pickup apparatus according to the present exemplary embodiment having the zoom lens 100 illustrated in FIG. 7. In the example illustrated in FIG. 8, the processing indicated with the same step number as that illustrated in FIG. 6 indicates the same processing as the corresponding processing illustrated in FIG. 6.

In step S20, the optical system parameter acquisition unit 21 acquires the parameters, such as focusing parameters, zooming parameters, aperture parameters, and extender parameters, from the detection units 11 through 14. Instep S21, the SD/HD receiving unit 28 of the zoom lens 100 receives the information about the type of the image pickup apparatus 200 (SD or HD) from the SD/HD transmission unit 63.

In step S30, the received information about the type of the image pickup apparatus 200 is transmitted to the depth calculation unit 22. The depth calculation unit 22 calculates the depth of focus $\epsilon$. Furthermore, the depth calculation unit 22 transmits the calculated depth of focus $\epsilon$ to the comparison calculation unit 23. Thereafter, the present exemplary embodiment executes the same processing as that described above in the first exemplary embodiment.

In the present exemplary embodiment, the SD/HD transmission unit 63 is provided to the image pickup apparatus 200. However, the present exemplary embodiment is not limited to this. More specifically, the same effect can be achieved by employing the following configuration. More specifically, in this case, the zoom lens 100 can include a mode switching unit and the user can switch the mode of the image pickup apparatus 200 (SD or HD) by hand.

Figure 9:
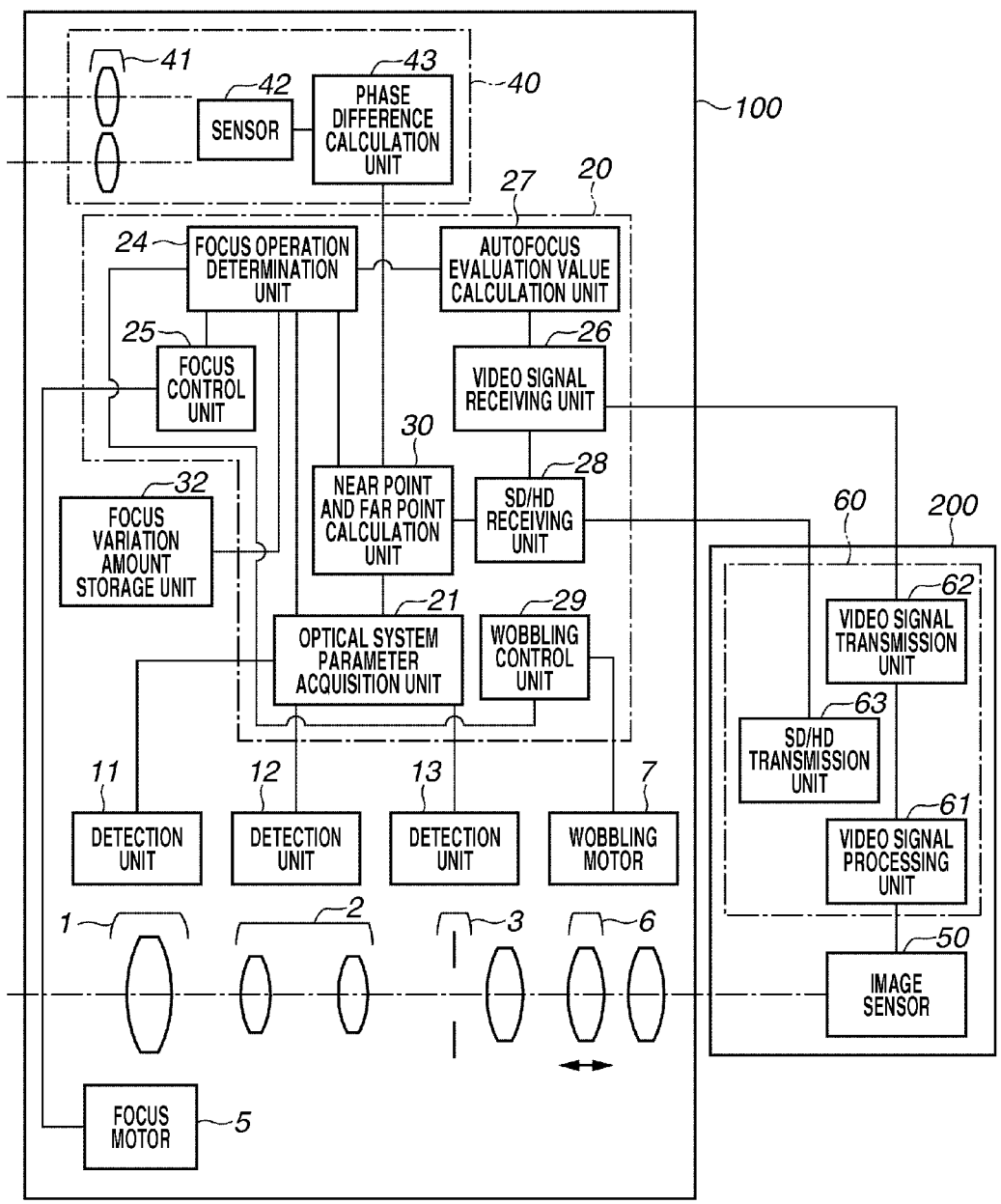
FIG. 9 illustrates an exemplary configuration of an image pickup apparatus having a zoom lens according to a third exemplary embodiment of the present invention.

FIG. 9 illustrates an exemplary configuration of a third exemplary embodiment of the present invention. The zoom lens according to the present exemplary embodiment is different from the zoom lens according to the second exemplary embodiment illustrated in FIG. 7 in the following points. More specifically, in the present exemplary embodiment, a wobbling lens unit 6, which minutely moves along the optical axis in very small increments to determine the direction of the focus, instead of the extender lens unit 4 and the detection unit 14 of the optical system according to the second exemplary embodiment. The wobbling lens unit 6 is driven by a wobbling motor 7.

Furthermore, instead of the depth calculation unit 22, the comparison calculation unit 23, and the image plane variation amount storage unit 31, which are provided in the zoom lens 100 according to the second exemplary embodiment (FIG. 7), the zoom lens 100 according to the present exemplary embodiment includes a wobbling control unit 29, a near point and far point calculation unit 30, and a focus variation amount storage unit 32.

The focus variation amount storage unit 32 records the relationship between the predetermined positional displacement amount $\Delta Fp0$ and a detection resolution of the distance measurement unit 40. The displacement amount $\Delta Fp0$ is set at a minimum displacement amount acquired when the detection resolution of the distance measurement unit 40 and the displacement amount of the focusing lens unit 1 are set at the same pitch. Accordingly, as illustrated in FIG. 5, the pixel value (distance measurement value) of the distance measurement sensor 42 and the position of the focusing lens unit 1 can be uniquely determined.

Accordingly, in the present exemplary embodiment, in determining the position of the focusing lens unit 1, it is not required to prepare a memory table storing the focus position according to each focal length and object distance as it is in the above-described first and the second exemplary embodiments. Therefore, the processing speed can be increased.

After the zoom lens 100 is powered on, the parameters of the optical system for focusing, zooming, and an iris, are transmitted to the optical system parameter acquisition unit 21 from the detection units 11 through 13. The optical system parameter acquisition unit 21 transmits a focus position "Obj" to the focus operation determination unit 24. In addition, the optical system parameter acquisition unit 21 transmits the focal length F and an F-number Fno to the near point and far point calculation unit 30.

On the other hand, after a communication with the image pickup apparatus 200 is established, the SD/HD transmission unit 63 transmits information about the type of the image pickup apparatus 200 (SD or HD) to the near point and far point calculation unit 30 via the SD/HD receiving unit 28 of the zoom lens 100. Because the permissible circle of confusion $\delta$ differs according to the type of the image pickup apparatus 200, the permissible circle of confusion $\delta$ is appropriately selected according to the received image pickup apparatus type information.

The phase difference calculation unit 43 of the distance measurement unit 40 calculates the phase difference based on the information transmitted from the distance measurement sensor 42. Furthermore, the object distance L is transmitted to the near point and far point calculation unit 30.

The near point and far point calculation unit 30 executes operations by using the following expressions (13) through (17) to calculate a hyperfocal distance H, a near point distance Sn, a far point distance Sf, a resolution "Det" of the distance measurement unit 40, and a depth of focus (Sf–Sn). The result of the calculation is transmitted to the focus operation determination unit 24.

$$H = f^2/(\delta \cdot Fno) \quad (13)$$

$$Sf = H \cdot L/(H-L) \quad (14)$$

$$Sn = H \cdot L/(H+L) \quad (15)$$

$$Det = 2L/(n^2 - 1) \quad (16)$$

$$(Sf - Sn) = 2H \cdot L^2/(H^2 - L^2) \quad (17)$$

where "n" denotes the phase difference of the distance measurement unit 40.

On the other hand the focus operation determination unit 24 calculates the predetermined variation amount ΔFp of the focusing lens unit 1 corresponding to the received phase difference, based on the information stored on the focus variation amount storage unit 32. The distances Sf and Sn, the resolution Det, and the depth of focus (Sf–Sn) calculated by using the expressions (14) through (17) and the focus position Obj received from the optical system parameter acquisition unit 21 are transmitted to the focus operation determination unit 24.

The focus operation determination unit 24 executes an operation according to the following expressions (18) through (20):

$$Sf\text{-Obj} > 0 \text{ or}$$

$$\text{Obj} - Sn > 0 \quad (18)$$

$$(Sf - Sn) - Det < 0 \quad (19)$$

$$Sf\text{-Obj} < 0 \text{ or}$$

$$\text{Obj} - Sn < 0 \quad (20).$$

If the condition expressed by the expression (18) is satisfied, then the focusing operation is not executed. Accordingly, in this case, no signal is output to components subsequent to the focus operation determination unit 24. If the condition expressed by the expression (19) or (20) is not satisfied, an autofocusing operation according to a first autofocus (AF) unit (i.e., external light AF) is executed.

In this case, the focus operation determination unit 24 transmits a signal to the focus control unit 25 to cause the focus control unit 25 to drive the focusing lens unit 1 by an amount equivalent to the predetermined variation amount ΔFp.

The focus control unit 25 converts the drive amount into a rotational angle and transmits the rotational angle that is equivalent to a necessary displacement amount to the focus motor 5. The focus motor 5 rotationally drives the focusing lens unit 1.

If the conditions expressed by the expressions (18) and (19) are satisfied at the same time, then an AF operation by using a second AF unit (i.e., contrast AF) is executed. In this case, a video signal input to the image sensor 50 of the image pickup apparatus 200 is transmitted to the video signal processing unit 61. The video signal is further received by the video signal receiving unit 26 of the zoom lens 100 via the video signal transmission unit 62. The autofocus evaluation value calculation unit 27 extracts the contrast value only.

To determine the direction of movement during focusing, in which the contrast value becomes large, the focus operation determination unit 24 instructs the wobbling motor 7 via the wobbling control unit 29 to cause the wobbling motor 7 to minutely drive the wobbling lens unit 6 in small increments along the optical axis.

To maximize the contrast value according to the instruction for determining the direction, the focus operation determination unit 24 instructs the focus motor 5 via the focus control unit 25 to cause the focus motor 5 to drive the focusing lens unit 1.

As described above, according to the present exemplary embodiment, which includes the wobbling lens unit 6 in addition to the configuration of the first and the second exemplary embodiments, the autofocusing operation can be primarily executed at a high speed. In the present exemplary embodiment, the autofocus evaluation value calculation unit 27 is provided within the zoom lens 100. However, the present exemplary embodiment is not limited to this. More specifically, the same effect can be achieved if the autofocus evaluation value calculation unit 27 is provided to the image pickup apparatus 200.

Figure 10:
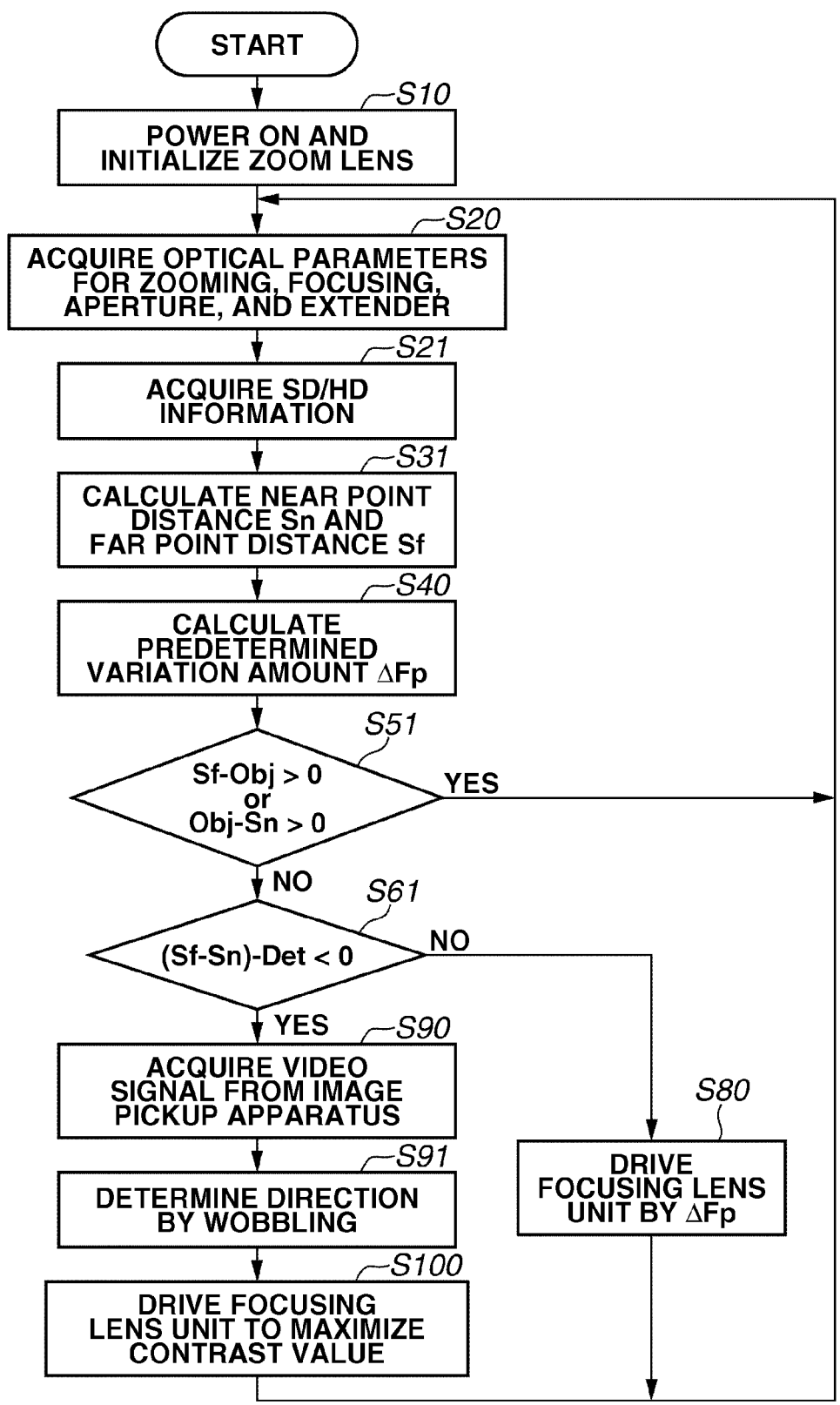
FIG. 10 is a flow chart illustrating an exemplary flow of processing according to the third exemplary embodiment.

FIG. 10 is a flow chart illustrating an exemplary flow of an AF operation executed by the image pickup apparatus 200 having the zoom lens 100 illustrated in FIG. 9. Referring to FIG. 10, in step S10, the zoom lens 100 is powered on and initialized. In step S20, simultaneously as the end of the initialization, the optical system parameter acquisition unit 21 acquires the parameters, such as focusing parameters, zooming parameters, and iris parameters, from the detection units 11 through 13.

After a communication with the image pickup apparatus 200 is established, in step S21, the SD/HD receiving unit 28 of the zoom lens 100 receives the information about the type of the image pickup apparatus 200 (SD or HD) from the SD/HD transmission unit 63. In step S31, the near point and far point calculation unit 30 acquires the optical system parameter values and type information about the image pickup apparatus 200.

In addition, the near point and far point calculation unit 30 acquires the object distance L from the distance measurement unit 40. Then, the near point and far point calculation unit 30 calculates the far point distance Sf, the near point distance Sn, the detection accuracy (resolution) Det of the distance measurement unit 40, and the depth of focus (Sf–Sn). The near point and far point calculation unit 30 then transmits the results of the calculation to the focus operation determination unit 24.

In step S40, the focus operation determination unit 24 calculates the predetermined variation amount ΔFp of the focusing lens unit 1, which corresponds to the phase difference received from the distance measurement unit 40, based on the information stored on the focus variation amount storage unit 32. In step S51, the focus operation determination unit 24 executes an operation by using the expression (18) based on the distances Sf and Sn and the focus position Obj acquired from the optical system parameter acquisition unit 21.

If the condition expressed by the expression (18) is satisfied (YES in step S51), then the processing returns to step S20 because the focusing operation is not to be executed. On the other hand, if the condition expressed by the expression (18) is not satisfied (NO in step S51), then the processing advances to step S61. In step S61, the focus operation determination unit 24 executes an operation by using the expression (19) using the resolution Det and depth of focus (Sf–Sn).

If the condition expressed by the expression (19) is not satisfied (NO in step S61), then the processing advances to step S80. In step S80, the AF operation by using the first AF unit (i.e., external light AF) is executed. More specifically, in step S80, the focus operation determination unit 24 transmits a signal to the focus motor 5 via the focus control unit 25 to cause the focus motor 5 to drive the focusing lens unit 1 by an amount equivalent to the predetermined variation amount ΔFp.

On the other hand, if the condition expressed by the expression (19) is satisfied (YES in step S61), then the AF operation by using the second AF unit (i.e., contrast AF) is executed. In step S90, a video signal input to the image sensor 50 of the image pickup apparatus 200 is received by the video signal receiving unit 26 of the zoom lens 100 via the video signal processing unit 61 and the video signal transmission unit 62. The autofocus evaluation value calculation unit 27 extracts the contrast value only.

In step S91, to determine the direction of movement for focusing, in which the contrast value becomes large, the focus operation determination unit 24 instructs the wobbling motor 7 via the wobbling control unit 29 to cause the wobbling motor 7 to minutely drive the wobbling lens unit 6 in small increments along the optical axis. In step S100, to maximize the contrast value according to the instruction for determining the direction, the focus operation determination unit 24 instructs the focus motor 5 via the focus control unit 25 to cause the focus motor 5 to drive the focusing lens unit 1.

According to the autofocusing zoom lens according to each exemplary embodiment of the present invention, optimum autofocusing can be executed in various environments and cases by executing appropriate autofocusing according to shooting conditions and characteristic of the image pickup apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-081437 filed Mar. 31, 2010, which is hereby incorporated by reference herein in its entirety.

What is claimed is:

1. An autofocusing zoom lens, which is capable of being detachably mounted on an image pickup apparatus and includes, in order from an object side to an image side, a focusing lens unit configured to move during focusing, a variable-magnification lens unit configured to move during variation of magnification, and a variable diaphragm capable of varying an aperture diameter, the autofocusing zoom lens comprising:

a position detection unit configured to detect a position of the focusing lens unit;

a magnification-varying state detection unit configured to detect a position of the variable-magnification lens unit; and an aperture value detection unit configured to detect an aperture value of the variable diaphragm;

a distance measurement unit configured to measure a distance to an object;

a communication unit configured to communicate with the image pickup apparatus;

a video signal receiving unit configured to receive a video signal from the image pickup apparatus;

a first autofocusing unit configured to drive the focusing lens unit based on a result of detection by the distance measurement unit; and a second autofocusing unit configured to drive the focusing lens unit based on the video signal from the image pickup apparatus, wherein a near point distance Sn and a far point distance Sf are obtained based on a focal length F and a diameter of a permissible circle of confusion δ, wherein if a current focus position Obj and a resolution Det of the distance measurement unit satisfy the following first condition:

$Sf-\text{Obj}>0$ or $\text{Obj}-Sn>0$, the focusing lens unit is not driven, wherein if the first condition is not satisfied and the following second condition is satisfied:

$(Sf-Sn)-\text{Det}<0$ and $Sf-\text{Obj}<0$ or $\text{Obj}-Sn<0$, the focusing lens unit is driven based on the second autofocusing unit, and if the second condition is not satisfied, the focusing lens unit is driven based on the first autofocusing unit.

2. The autofocusing zoom lens according to claim 1, wherein the distance measurement unit performs the following operations based on an object distance (L) from the autofocusing zoom lens to an object, a phase difference (n) of the distance measurement unit, and a hyperfocal distance (H) of the autofocusing zoom lens:

$Sf=H\cdot L/(H-L)$ $Sn=H\cdot L/(H+L)$ $\text{Det}=2L/(n^2-1)$ $(Sf-Sn)=2H\cdot L^2/(H^2-L^2)$.

3. The autofocusing zoom lens according to claim 2, wherein communication with the image pickup apparatus is executed with the autofocusing zoom lens mounted on the image pickup apparatus, and wherein the permissible circle of confusion δ is switched according to information received from the image pickup apparatus.

4. The autofocusing zoom lens according to claim 1, further comprising a mode switching unit configured to switch a mode of the image pickup apparatus, wherein the permissible circle of confusion δ is switched according to the mode of the image pickup apparatus.

5. The autofocusing zoom lens according to claim 1, further comprising an extender lens unit, wherein the focal length F is switched according to whether the extender lens unit has been inserted.

6. A camera apparatus comprising:

the autofocusing zoom lens according to claim 1; and an image pickup apparatus located on the image side of the autofocusing zoom lens.

7. The autofocusing zoom lens according to claim 1, further comprising a wobbling lens unit configured to determine a direction of focus of the second autofocusing unit, at a position on the image side of the variable-magnification lens unit, separately from the focusing lens unit.

* * * * *